United States Patent [19]
Christy

[11] Patent Number: 5,697,494
[45] Date of Patent: Dec. 16, 1997

[54] ROLLER CONTACT SWITCH AND SMART BOOK USING SAME

[75] Inventor: Scott Thomas Christy, Franklin, Wis.

[73] Assignee: Golden Books Publishing Company Inc., Racine, Wis.

[21] Appl. No.: 541,607

[22] Filed: Oct. 10, 1995

[51] Int. Cl.$^6$ .................................. H01H 13/52
[52] U.S. Cl. ........................... 200/530; 200/277.1
[58] Field of Search ..................... 200/277.1, 277, 200/530, 531, 536, 547, 549

[56] References Cited

U.S. PATENT DOCUMENTS

| | | | |
|---|---|---|---|
| 4,054,766 | 10/1977 | Kramer | 200/530 X |
| 4,102,067 | 7/1978 | Tarrant. | |
| 4,175,223 | 11/1979 | Lauritsen et al. | 200/277.1 |
| 4,218,599 | 8/1980 | Garn | 200/530 |
| 4,222,188 | 9/1980 | Tarrant et al.. | |
| 4,355,984 | 10/1982 | Slavik et al.. | |
| 4,636,881 | 1/1987 | Brefka et al.. | |
| 4,703,573 | 11/1987 | Montgomery et al.. | |
| 4,778,391 | 10/1988 | Weiner. | |
| 4,791,741 | 12/1988 | Kondo. | |
| 4,809,246 | 2/1989 | Jeng. | |
| 4,990,092 | 2/1991 | Cummings. | |
| 5,167,508 | 12/1992 | Mc Taggart. | |
| 5,209,665 | 5/1993 | Billings et al.. | |
| 5,422,452 | 6/1995 | Chang et al. | 200/277 |

FOREIGN PATENT DOCUMENTS

| | | | |
|---|---|---|---|
| 708296 | 7/1941 | Germany | 200/277.1 |

*Primary Examiner*—Renee S. Luebke
*Attorney, Agent, or Firm*—Amster, Rothstein & Ebenstein

[57] ABSTRACT

A roller contact switch, designed for use in a housing having opposed ends of an interrupted electrical circuit, includes an axially extending, electrically non-conductive member. The non-conductive member includes an axially extending portion, which is substantially rigid against any transverse movement, partially received in the housing for sliding axial movement relative thereto, and an axially extending portion which is substantially resilient for a transverse movement of said flexible portion relative to said rigid portion and has a transversely biased free end defining a roller seat. The non-conductive member is biased for sliding axial movement towards one of the on and off positions. An electrically conductive rigid roller has a transversely extending cylindrical body supported by the roller seat for rotation within the housing relative thereto and for movement with the non-conductive member distal end between a first position, wherein the roller operatively connects opposed ends of an interrupted electrical circuit in the housing, and a second position wherein the roller is offset therefrom, the roller being biased by the roller seat in a transverse direction towards the opposed ends of the interrupted electrical circuit in the housing.

11 Claims, 6 Drawing Sheets

ROLLER CONTACT SWITCH AND SMART BOOK USING SAME

BACKGROUND OF THE INVENTION

The present invention relates to a roller contact switch for use in a housing having opposed ends of an interrupted electrical circuit, and more particularly to a "smart" book or interactive audiovisual work which uses such a switch to keep track of the page to which the book is open.

A variety of different sliding contact switches have been employed in sound-producing devices. See, for example, U.S. Pat. No. 4,102,067 and U.S. Pat. No. 4,222,188 (which disclose a spring-loaded actuator pin which is biased to a first position but movable to a second position to operate the device), and U.S. Pat. No. 4,791,741 and U.S. Pat. No. 4,980,092 (which disclose sound-producing devices which use spring-biased contacts or pressure switches).

Thus, while the prior art discloses a variety of different mechanisms utilized as sliding contact switches in sound-producing devices, it is devoid of any suggestion of the use of a roller contact switch. A roller contact switch would be highly preferable to a sliding contact switch of the type disclosed in the prior art, as the roller contact would produce less damage to the fixed contact points, would provide the device incorporating it with a smoother and easier switch motion, and would afford greater longevity and resistance to damage than a sliding contact.

Accordingly, it is an object of the present invention to provide a roller contact switch.

It is another object to provide such a roller contact switch suitable in one embodiment for use in a housing having opposed ends of an interrupted electrical circuit.

A further object is to provide such a roller contact switch suitable in one embodiment for use in a sound-generating device such as a "smart" interactive audiovisual work.

Yet another object to provide such a roller contact switch which is simple and inexpensive to produce, assemble, install and maintain.

It is also an object of the present invention to provide a "smart" interactive audiovisual work utilizing such a roller contact switch.

SUMMARY OF THE INVENTION

It has now been found that the above and related objects of the present invention are obtained in a novel roller contact switch for use in a housing having opposed ends of an interrupted electrical circuit. The switch comprises an axially extending, electrically non-conductive member having a distal end adapted to be at least partially disposed within a housing for sliding axial movement relative thereto between an on position and an off position. The non-conductive member includes an axially extending portion which is substantially rigid against any transverse movement and configured and dimensioned to be partially received in the housing for sliding axial movement relative thereto, and an axially extending portion which is substantially resilient for a transverse movement of the resilient portion relative to the rigid portion and has a transversely biased free end defining a roller seat. Means are provided for biasing the non-conductive member for sliding axial movement towards one of the on and off positions. An electrically conductive, rigid roller has a transversely extending cylindrical body, the roller body being configured and dimensioned to be supported by the roller seat of the resilient portion free end. It is supported by the roller seat both for rotation within the housing relative thereto and for movement with the member distal end between a first of the on and off positions, wherein the roller operatively connects opposed ends of an interrupted electrical circuit in the housing, and a second of the on and off positions, wherein the roller is offset therefrom. The roller is biased by the roller seat in a transverse direction towards the opposed ends of the interrupted electrical circuit in the housing. Preferably, the one position is the off position, the first position is the on position, and the second position is the off position.

In a preferred embodiment, the non-conductive member is unitary, integral, one-piece and formed in a single operation, preferably of plastic. The roller has an enlarged head at each end of the body, the enlarged heads being disposed on opposite sides of the roller seat. In the first position the enlarged heads are transversely aligned with the opposed ends of the interrupted electrical circuit and in the second position the enlarged heads are longitudinally offset from the opposed ends of the interrupted electrical circuit. The rigid portion has a distal end defining a U-shaped slot including a pair of parallel legs. Relative to a plane containing the legs, the resilient portion is at least partially disposed intermediate the parallel legs and has a free end transversely biased to the plane of the legs and extending distally beyond the legs to define the roller seat.

The present invention additionally encompasses an interactive book assembly comprising a book having a plurality of semirigid pages. Each of the pages has an exposed edge thereof with a respective uniquely positioned means for moving or permitting movement of a switch. A housing disposed adjacent the exposed page edges contains a plurality of the roller contact switches for sensing the presence or absence of the switch-moving means on the page to which the book is open, and means for responding to a user-initiated action with a response appropriate for the page to which the book is open. The rigid portions of the switches are slidingly axially movable relative to the housing by the switch-moving means.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 2:
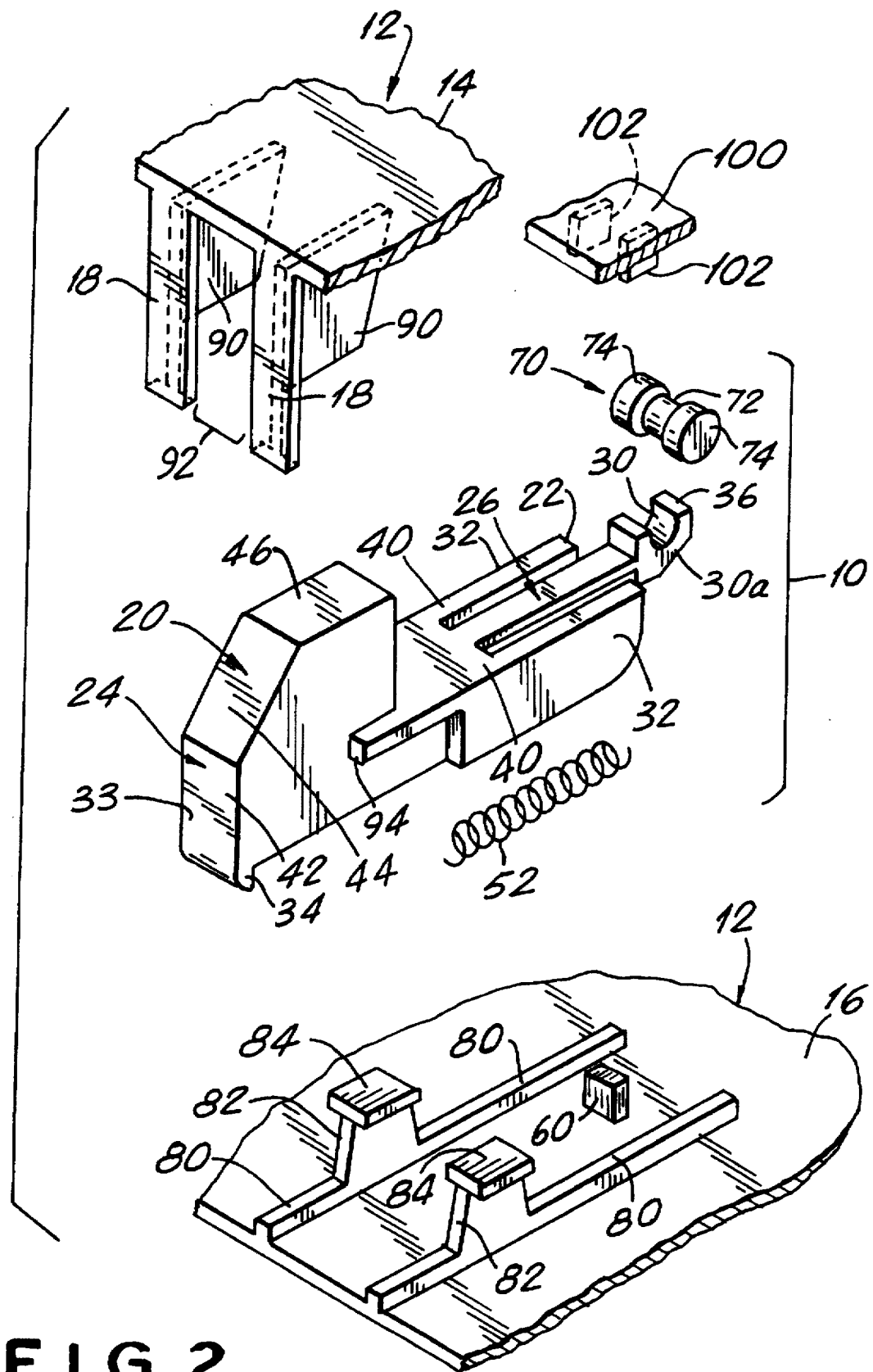
FIG. 2 is an exploded isometric view of a roller contact switch according to the present invention and its immediate environment.

Referring now to the drawing, and in particular to FIG. 2 thereof, therein illustrated is a roller contact switch according to the present invention, generally designated by the reference numeral 10. The switch 10 is designed for use in a housing, generally designated 12, including a top wall 14, a bottom wall 16 and a sidewall 18 bridging the same. The switch 10 will be described first, but reference will necessarily be made to portions of the housing 12 which interact with the switch 10 as it performs its functions.

As used herein, the portion of the switch 10 which contacts a page of the book is referred to as the near or proximal end of the switch while the other end of the switch (typically disposed within a housing 12 and never contacted by the book) is referred to as the far or distal end of the switch.

Figure 4:
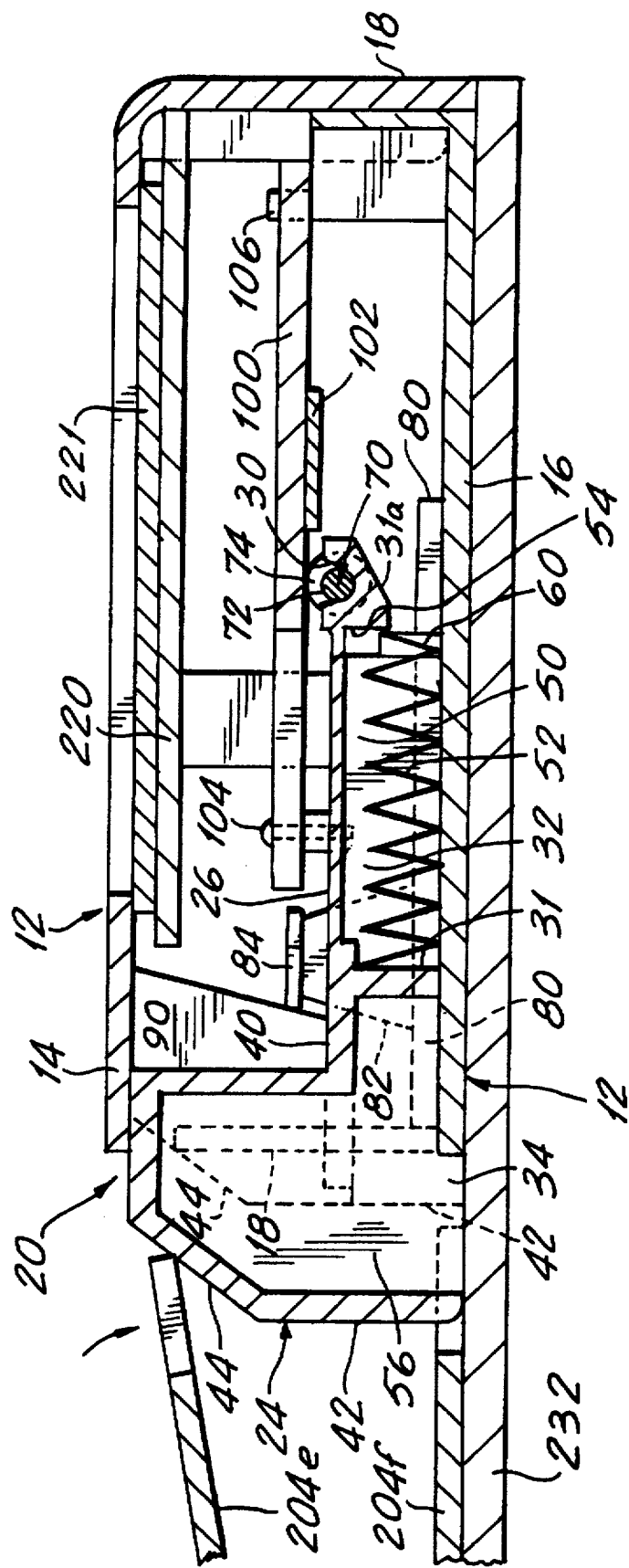
FIGS. 4 and 5 are sectional views of the book assembly taken along the lines 4—4 and 5—5, respectively, of FIG. 3.
Figure 5:
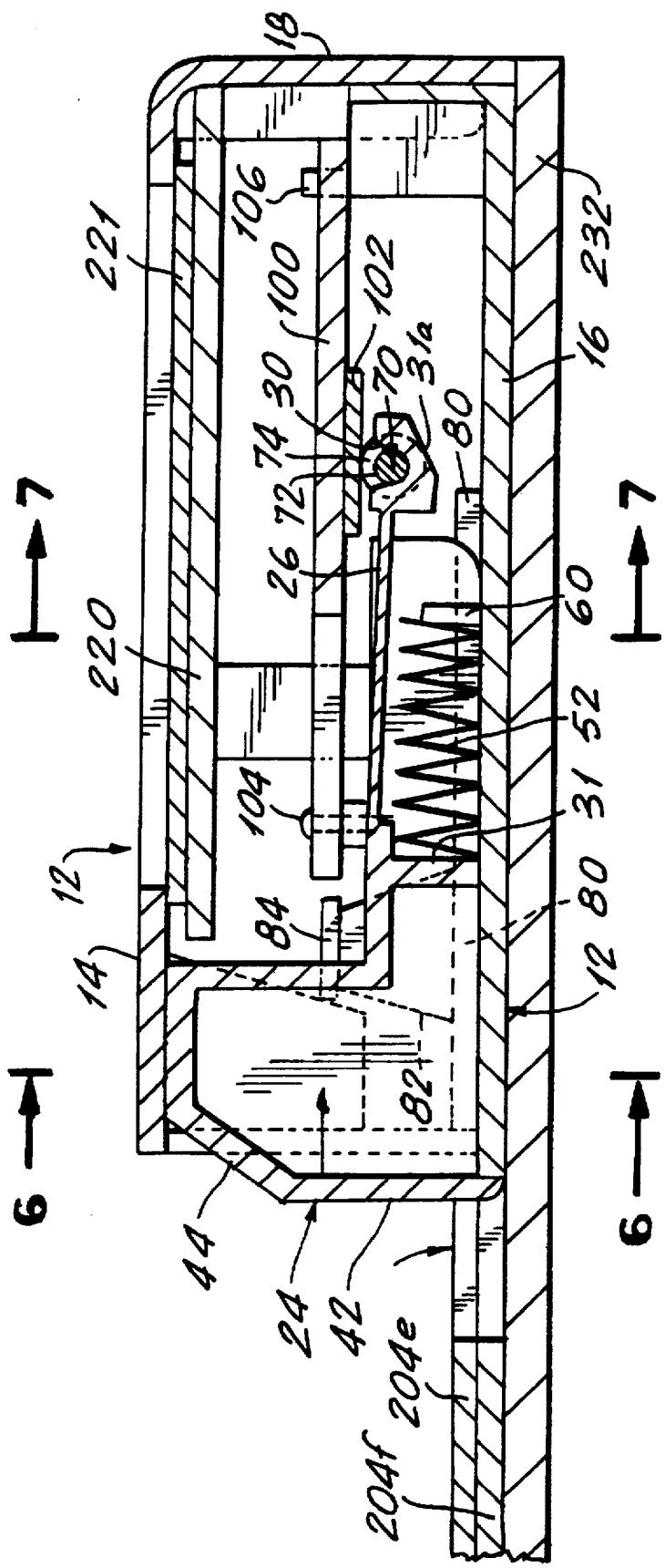
Figure 6:
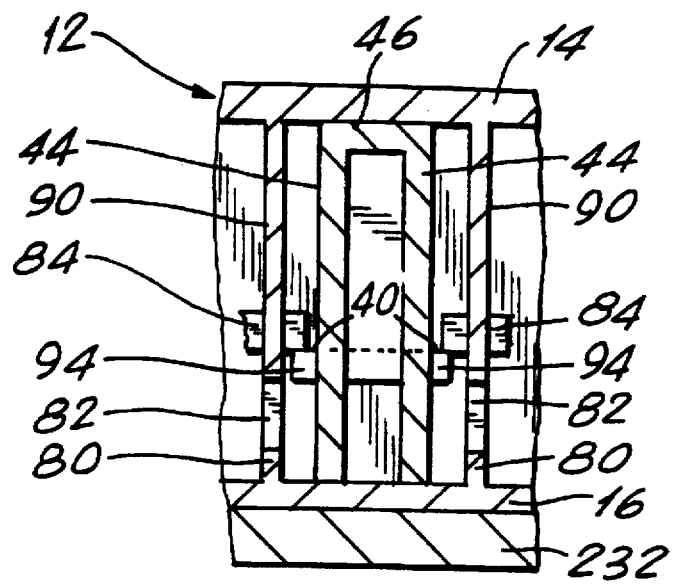
FIGS. 6 and 7 are sectional views of the book assembly taken along the lines 6—6 and 7—7, respectively, of FIG. 5.
Figure 7:
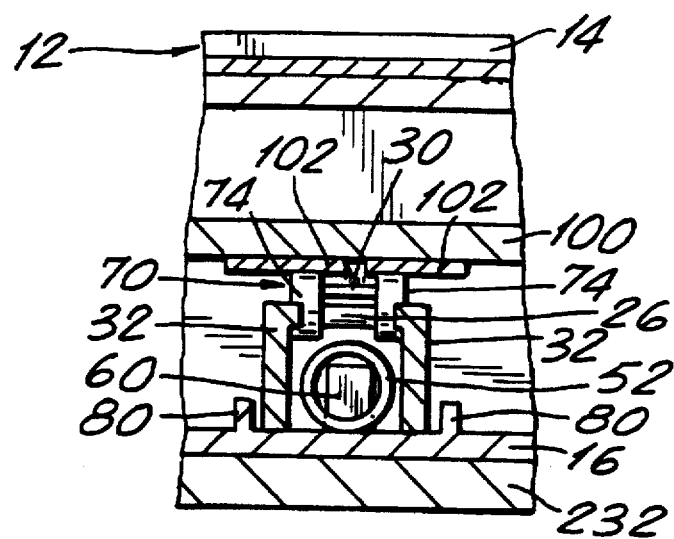

Basically, the switch 10 comprises an axially extending, electrically non-conductive member generally designated 20, the member having a distal end 22 adapted to be at least partially disposed within the housing 12 for sliding axial movement relative thereto (as illustrated, a longitudinal movement) between an on position (as illustrated in FIG. 5) and an off position (as illustrated in FIG. 4). More particularly, the non-conductive member 20 includes an axially extending portion, generally designated 24, which is substantially rigid against any transverse movement (as illustrated, a vertical movement or a lateral movement) and is configured and dimensioned to be partially received in the housing 12 for sliding axial movement relative thereto. The non-conductive member 20 further includes an axially extending portion, generally designated 26, which is substantially resilient for transverse movement of the resilient portion 26 relative to the rigid portion 24 (as illustrated, a vertical movement) and has a transversely biased free end defining a roller seat 30.

More particularly, the rigid portion 24 has a distal end 22 defining a U-shaped slot including a base 31 (see FIG. 4) and a pair of parallel legs 32, and has a proximal end 33 with a depending flange 34 which serves as a stop for distal movement of the non-conductive member 20. The legs 32 not only protect a substantial length of the resilient portion 26 from forces which might displace it laterally, but also limit the amount of lateral displacement which may occur, thereby substantially fixing the lateral position of the roller seat 30 without interfering with the upward and downward movement of the resilient portion 26. The top surface of the legs 32 extends rearwardly to define a continuous planar upper surface 40 for reasons which will be made clear below.

The proximal end 33 of the rigid portion 24 includes an upright or vertical lower surface 42, a distally and upwardly inclined middle surface 44, and a horizontal top surface 46, these being the user-accessible surfaces of the switch 10. Typically at least the inclined middle surface 44 is used to cause distal movement of the switch 10 as a semirigid page edge being turned down cams the surface 44 distally. The resilient portion 26 is at least partially disposed intermediate the parallel legs 32 and has a free end 36 extending distally beyond the legs 32 to define the roller seat 30 having a semicircular upper surface. The free end 34 is transversely biased relative to a plane containing the legs 32, generally to the plane of the legs 32.

Figure 3:
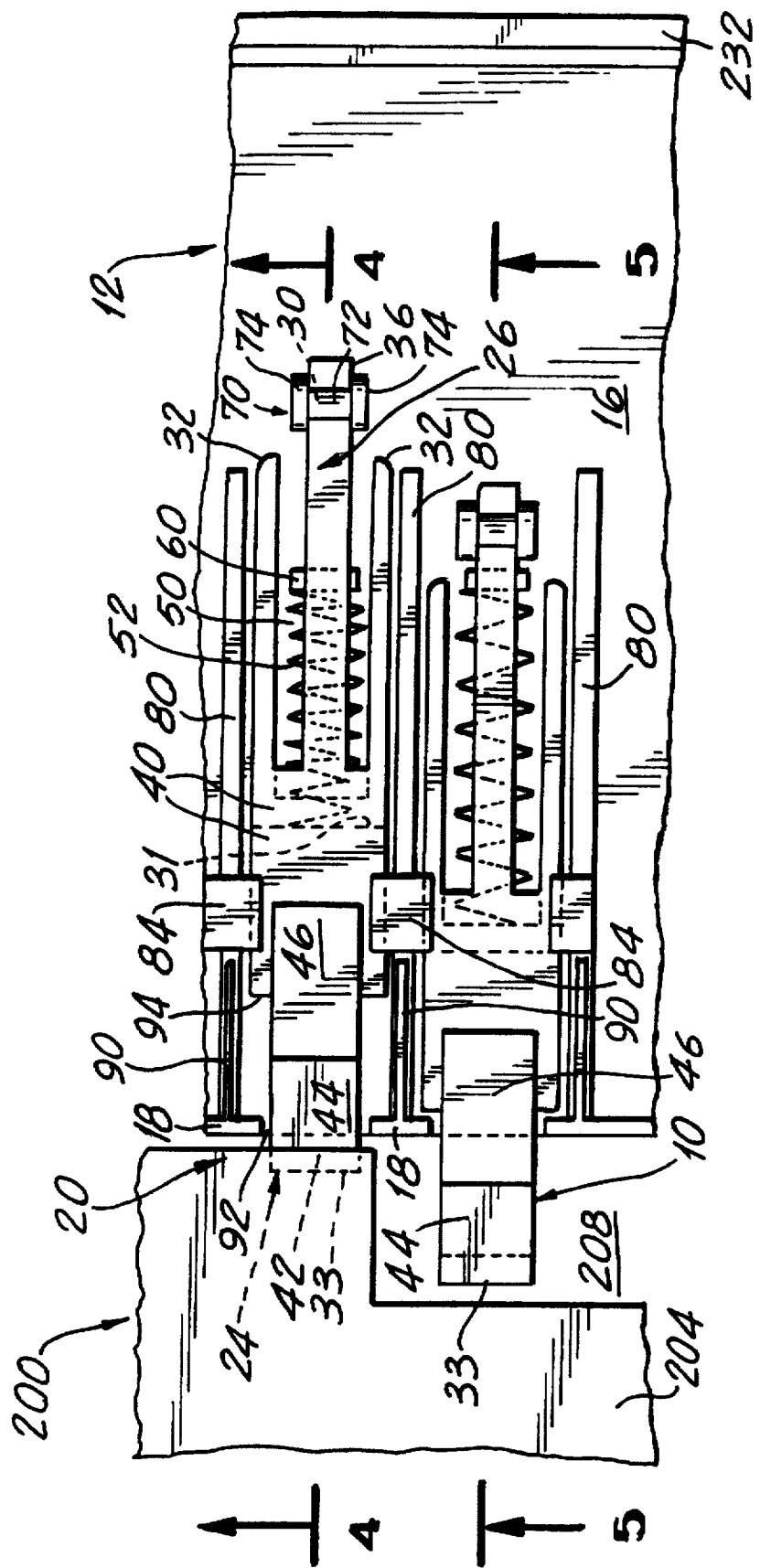
FIG. 3 is a top elevational view of the roller contact switch of the book assembly, with portions thereof removed to reveal details of internal construction.

As best seen in FIGS. 3–5, the base 31 and legs 32 of the rigid portion 24 cooperate with the resilient portion 26 to define a cavity 50 adapted to receive a spring 52. The U-shaped slot of the rigid portion 24 (defined by the base 31 and the legs 32) is effectively closed by a proximal surface 54 of the roller seat 30, which precludes lug 60 from leaving the slot. The proximal length of the resilient portion 26 sufficiently closes the top of the slot and the adjacent bottom wall 16 of the housing 12 sufficiently closes the bottom of the slot, so that the spring 52 is sandwiched into the slot between the resilient member 26 and the housing bottom wall 16, thereby to prevent escape of the spring 52 from the spring cavity 50. The bottom wall 16 of housing 12 also defines an upwardly projecting lug or spring stop 60 which enters into the spring cavity 50 and limits distal movement of the spring distal end, thereby anchoring spring 52 for exerting the desired proximal bias against stop wall 31.

It will be appreciated that the bottom distal surface 30a of the roller seat 30 is beveled distally and upwardly so that, as the switch 10 is moved distally relative to the spring stop 60 during the switch housing assembly process, the top of the spring stop 60 cams the roller seat 30 (and any roller 70 therein) upwardly and enables entry of the spring stop 60 into the spring cavity 50.

Preferably the rigid portion 24 proximal of the resilient portion 26 defines an open-bottom hollow or cavity 56 which reduces the material cost of the non-conductive member being manufactured and the inertia thereof as well, thereby facilitating axial movement of the non-conductive member 20 either by the book page camming the inclined surface 44 in the distal direction or by the spring 52 biasing the stop wall 31 relative to the housing 12 in the proximal direction.

In addition to the non-conductive member 20 and the spring 52 (which may be conductive or non-conductive), the switch 10 includes an electrically conductive, rigid roller, generally designated 70. The roller 70 has a transversely extending cylindrical body 72 which is configured and dimensioned to be supported by the roller seat 30 (at the free or distal end 36 of the resilient portion 26) for rotation within the housing 12 relative thereto. Preferably the body 72 has enlarged heads 74 at each end to prevent lateral displacement of the roller 70 from the roller seat 30 and to enable functional closing of the ends of an interrupted electrical circuit by the roller 70. As the roller seat 30 is substantially fixed relative to switch 10 along the proximal/distal and lateral axes (as the resilient portion is limited in its lateral motion by the legs 32 of the rigid portion 24), its main axis of motion is vertical. The position of the roller 70 along the vertical axis is, of course, influenced by the biasing of the seat-bearing resilient portion 26 relative to the switch 10 and the limits imposed by the housing above and below the roller 70.

The non-conductive member 20 is preferably a unitary, integral, one-piece construction, formed in a single operation, for example, from plastic. The plastic must be substantially rigid when used in the cross-sectional thicknesses of the rigid portion 24 yet substantially resilient, in at least one direction, when used in the cross-sectional thickness of the resilient portion 26. Preferred plastics include nylon and the acetyl homopolymers and copolymers. The roller 70 is preferably formed of, or at least coated with, a conductive material such as brass. Brass is easily machined, does not corrode, and is relatively inexpensive; however, other conductive materials (or non-conductive materials coated with conductive materials) may be employed.

Now that the switch component—the non-conductive member 20, the spring 52 and the roller 70—have been described in detail, we will comment on the interaction of the switch 10 with the housing 12. The role of the housing bottom wall 16 in closing the bottom of the spring cavity 50 and the role of the spring stop 60 in compressing the coiled compression spring 52 (as the switch 10 is moved distally relative to the housing 12) have already been discussed.

The housing bottom wall 16 additionally includes a spaced pair of parallel guides 80 which project upwardly a short distance and run from the proximal edge of the housing bottom wall 16 portion towards the distal edge thereof. The guides 80 are configured and dimensioned so that they limit lateral movement of the rigid portion 24 and its legs 32. Extending vertically upward from each guide 80 is a trapezoidal shaped lug 82 which, depending upon the portion of the non-conductive member 20 contacted thereby, acts on either the legs 32 or the proximal length of the rigid portion 24, again to prevent lateral movement of the switch 10 relative to the housing 12.

Finally, atop each lug 82 is a flange 84 extending horizontally in at least one direction across a portion of an upper surface 40 of a rigid portion 26. As a result, each upper surface 40 of a switch 10 has at least two flanges 84 extending partially thereover from opposite sides and acting to maintain the switch 10 in its appropriate vertical position—that is, with the housing bottom wall 16 closing the spring cavity 50. The flanges 84 also cooperatively act as vertical dividers to properly situate the switches 10 laterally within the housing 12. Thus, the flanges 84 reinforce the guides 80 by guiding the axial movement of the switch 10 along its longitudinal axis in the distal and proximal directions.

The top wall 14 of housing 12 defines adjacent the proximal edge thereof a plurality of thin vertical separators 90 which extend rearwardly from the housing sidewall 18 and downwardly from the housing top wall 14 terminating at the lugs 82 and flanges 84 in front and the guides 80 at the bottom. These vertical separators 90 do not normally engage the non-conductive member 20 but supplement the guides 80 in maintaining the non-conductive member 20 (and especially the proximal length of the rigid portion 24) in proper alignment for longitudinal motion between the guides 80. The housing sidewall 18 defines a plurality of gaps 92 of adequate width to enable movement therethrough proximally of the proximal length of the non-conductive member 20 up to but not including the extension of upper surface 40 terminating at surface 94. Alternatively, further proximal movement of the non-conductive member 20 under the influence of spring 52 can be precluded by the abutment of surface 94 (as a stop) against the aligned portions of housing sidewall 18.

It will be appreciated that the switch 10 is constrained for longitudinal movement by a variety of different, yet cooperating, techniques. The guides 80 act along the length of the switch 10, but especially on the bottom height level thereof. The lugs 82 and flanges 84 act primarily on the proximal lengths of the rigid portion 24, especially at the middle height level thereof. The housing sidewall 18 can be used to restrain lateral movement of the proximal portion of the proximal length of the rigid portion 24 along the entire height thereof extending through gap 92. Similarly, the rigid portion 24 is stabilized against vertical movement by the housing bottom wall 14, the housing top wall 12 (acting primarily on the proximal length thereof) and the lugs 84 (acting on the upper surface 40) therebetween.

A printed circuit board (PCB) 100, or a like electrical element, having thereon opposed ends 102 of an interrupted electrical circuit, is deposed within the housing 12 and secured thereto by screws 104, lugs 106 and the like. The opposed ends 102 of the interrupted electrical circuit are in the bottom plane of the printed circuit board 100 or extend slightly therebelow as illustrated. The opposed ends 102 are disposed relative to the roller seat 30 such that, when the switch 10 is moved to its distal position (illustrated at the top of FIG. 3 and in FIG. 5 and in phantom line in FIG. 4) the enlarged heads 74 will roll under the PCB 100 and the opposed ends 102, making a rolling physical contact therewith and an electrical contact therebetween. The upward bias of the resilient portion 26 accommodates the downward movement of the roller seat 30 as the resilient portion 26 carrying roller heads 74 depresses slightly to accommodate any extent to which the opposed circuit ends 102 are below the plane of the circuit board 100, as shown in FIG. 5. As the switch 10 is withdrawn from its distal position to its proximal position (under the influence of the spring 52), as illustrated in the bottom of FIG. 3, and in solid line in FIG. 4, the upward bias of the resilient portion 26 will cause the roller heads 74 to move upwardly as they leave the opposed ends 102 of the interpreted electrical circuit and roll over the PCB 100, breaking both physical contact with and electrical contact between the opposed ends 102.

Compared to the typical sliding contact switch, the roller contact switch of the present invention affords numerous advantages. First, the rolling contact between the roller 70 of switch 10 and the ends 102 of the interrupted electrical circuit produces less damage to the fixed contact points 102 which may otherwise deteriorate (e.g., become scraped away) due to a sliding action. Second, a simply downward pressure on the inclined surface 44 of switch 10 (e.g., by a semirigid book page) will squeeze the entire switch 10 distally along its longitudinal axis with a smoother and easier switch motion than the typical sliding contact switch. Third, the switch 10 is characterized by a long life and a resistance to damage (from being dropped, or the like) because none of the contacts are simple wires which can easily be accidentally bent out of shape.

The housing 12 is formed of any rigid non-conductive material and preferable acrylonitrile-butadiene-styrene (ABS) copolymer or high important polystyrene or polyproplylene. The non-conductive member 20 is preferably formed of acetyl homopolymer or copolymer, or a nylon, although different materials may be used. The spring 52 is preferably made of a resilient metal, whether conductive or not.

While the roller contact switch 10 of the present invention finds utility in any housing having opposed ends of an interrupted electrical circuit, it is especially useful in an interactive book assembly or like interactive audiovisual work, which is "smart"— i.e., it knows to which page a book is open. This permits the assembly to make appropriate comments for the particular page to which the book is open and to respond to input from the user in a way which is appropriate to the particular page to which the book is open (as opposed to any other page of the book).

Figure 1:
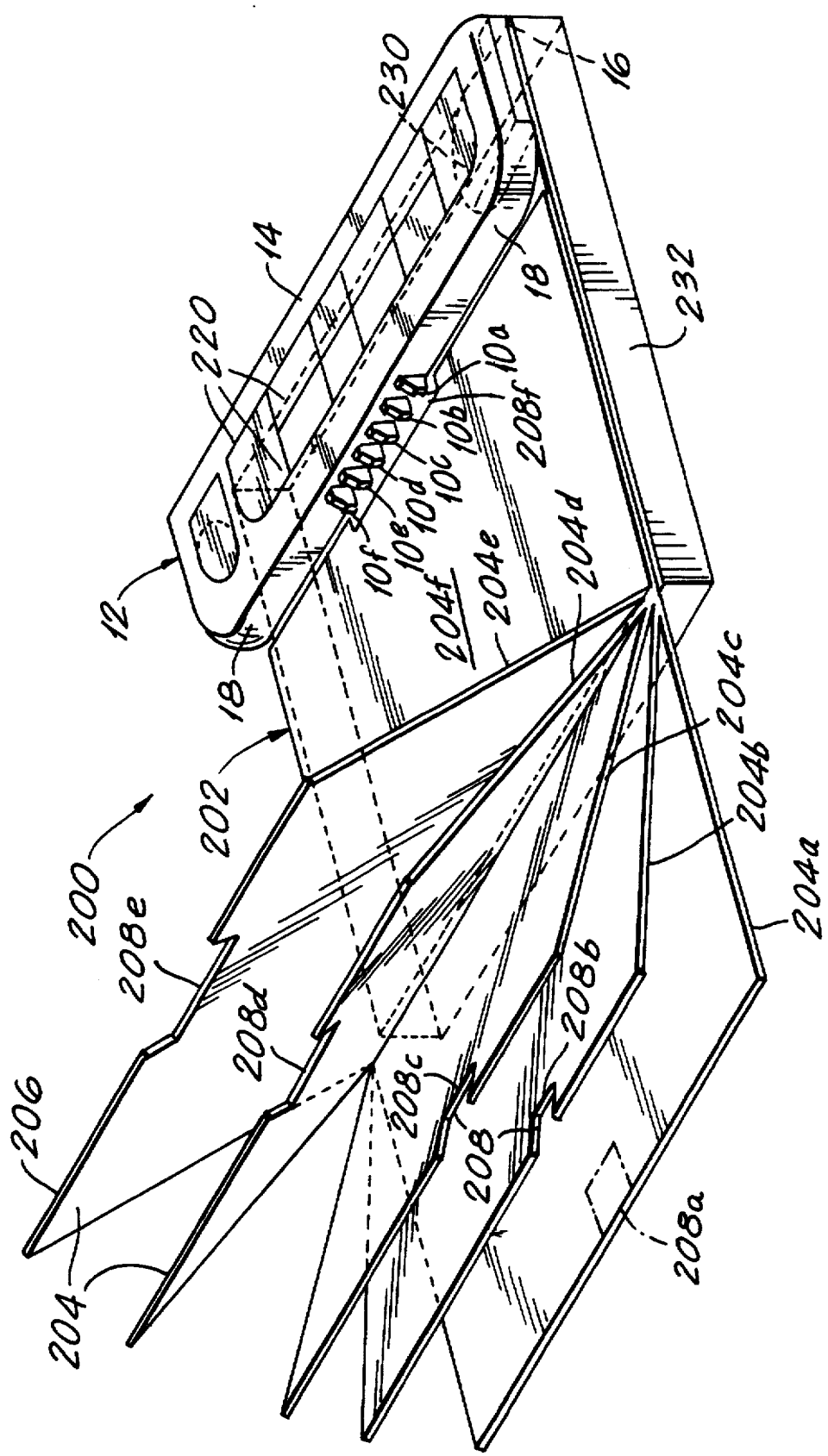
FIG. 1 is an isometric view of a book assembly according to the present invention, open to the last page thereof.

Referring now to the drawing, and in particular to FIG. 1 thereof, therein illustrated is a "smart" interactive book assembly according to the present invention, generally designated 200. The assembly 200 includes a book generally designated 200 having a plurality of pages 204a, 204b . . . 204f. Each of the pages 204 has an exposed edge 206 thereof with a respective uniquely positioned means 208a, 208b . . . 208f for moving or permitting movement of a switch 10.

A housing, generally designated 12, is disposed adjacent to the exposed page edges 206 of the book 202 when the pages 204 thereof are in a closed orientation. As described hereinabove, the housing 12 contains a plurality of roller contact switches 10 for sensing the presence or absence of a switch-moving means 208 on the page to which the book is open. The means 208 is illustrated as a recess in the exposed book page edge. As illustrated, there are five pages 204b–f (excluding the cover 204a) and six switches, an initialization switch and 5 page identification switches 10a, 10b, 10c, . . . 10f. The cover 204a lacks any means corresponding to means 208b–208f, but the closed state of the book when the cover is closed is recognizable by the absence of any release of any switches (i.e., by the means 208a being filled (as indicated in the phantom line).

In the implementation indicated, opening of cover 204a allows both initialization switch 10a and page identification switch 10b to extend through the aligned portions of recesses 208a–208f. The proximal movement of initialization switch 10a or the actuation of any of several membrane switches 220 disposed on the housing top (covered by a label 221 and actuatable by the user) initializes or "wakes up" the electrical circuitry, which then becomes sensitive to any subsequent movement of the pages. (The membrane switches 220 are preferably formed of folded-over polyester sheets, with opposing surfaces being separated by spacers and one surface bearing interleaved leads and the other surface bearing contacts.) This is an energy saving feature as the status of the other switches 10b–10f of the present invention need not be constantly monitored.

As earlier noted, opening of the cover page 204a allows the proximal movement of both switches 10a and 10b. The proximal position of switch 10b indicates to the now active electrical circuitry on the printed circuit board 100 and elsewhere that the book has been opened to page 1. When the book is opened to page 2, the proximal position of the switch 10c now indicates to the circuitry that the book is open to page 2. This continues until, as illustrated in FIG. 1, the book is open to the last page 204f and the recess 208f thereof enables proximal movement of all six of the switches 10a–10f, indicating that the book is open to the fifth page. Appropriate circuitry is provided to ensure that it is the position of the switch indicating the highest number page which prevails and identifies the page to which the book is open.

Clearly the initialization switch 10a may be dispensed with so that the number of switches according to the present invention are equal to the number of pages of the book (excluding the cover). The initialization switch may be easily replaced by an on/off switch to effect the same saving in electrical power. Indeed, a wide variety of different electrical circuits may be employed to interpret the movement of one or more switches so as to identify the page to which the book is open.

The casing may include additional conventional features of the type found in interactive audiovisual works such as one or more speakers 230, batteries (not shown), and the like. Similarly, the assembly 200 may include a casing 232 on which both the book 202 and the housing 12 are secured. The book 202 may be removably secured to the casing 232, thereby to enable replacement of one book by another, preferably with the old and new books having different effects on another roller contact switch according to the present invention so as to indicate to the electrical circuitry that a different book is being read and that therefore different responses should be provided for a scheme of switches indicating a particular page to which the book is open.

The terms "on position" and "off position" as used herein and in the claims is arbitrary with respect to the closing or opening of an interrupted electrical circuit. Thus, the movement of the switch to the "on" (or "off") position may in a given instance result in either the opening or closing of the interrupted electrical circuit. Similarly, depending upon the length of the switch in the axial direction and the position of the contacts of an interrupted electrical circuit, the conductive roller may close the interrupted electrical circuit either when the switch is in the distal position (as illustrated in FIG. 5) or when the switch is in the proximal position. This is simply a matter of design architecture and does not affect the structure or functioning of the switch according to the present invention. Similarly, while the page edges adjacent the switches have been illustrated as having recesses or notches into which the switches move proximally under the influence of the biasing means, alternatively the page edges adjacent the switches may have projections or extensions which move the switches to the distal position against the influence of the biasing means. Thus, the roller contact switches of the present invention sense on the page to which the book is open the presence or absence of switch-moving means for moving or permitting movement of a switch, and the housing includes means for responding to a user-initiated action with a response appropriate for the page to which the book is open. This too is merely a matter of design architecture. It is well within the skill of those in the switch art to make each of the aforementioned design choices for particular applications.

To summarize, the present invention provides a roller contact switch which is suitable in one embodiment for use in a housing having opposed ends of an interrupted electrical circuit and, in particular, in a sound-generating device such as a "smart" interactive audiovisual work. The roller contact switch is simple and inexpensive to produce, assemble, install and maintain. The present invention further encompasses a "smart" interactive audiovisual work utilizing such a roller contact switch.

Now that the preferred embodiment of the present inventions have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A roller contact switch for use in a housing having opposed ends of an interrupted electrical circuit, said switch comprising:

(A) an axially extending, electrically non-conductive member having a distal end adapted to be at least partially disposed within a housing for sliding axial movement relative thereto between an on position and an off position, said non-conductive member including:

(i) an axially extending portion which is substantially rigid against any transverse movement and configured and dimensioned to be partially received in the housing for sliding axial movement relative thereto; and (ii) an axially extending portion which is substantially resilient for a transverse movement of said resilient portion relative to said rigid portion and has a transversely biased free end defining a roller seat;

(B) means biasing said non-conductive member for sliding axial movement towards one position of said on and off positions; and (C) an electrically conductive, rigid roller having a transversely extending cylindrical body, said roller body being configured and dimensioned to be supported by said roller seat of said resilient portion free end for rotation within the housing relative thereto and for movement with said member distal end between a first position of said on and off positions, wherein said roller operatively connects opposed ends of an interrupted electrical circuit in the housing, and a second position of said on and off positions, wherein said roller is offset therefrom, said roller being biased by said roller seat in a transverse direction towards the opposed ends of the interrupted electrical circuit in the housing.

2. The switch of claim 1 wherein said one positions is said off position.

3. The switch of claim 1 wherein said non-conductive member is unitary, integral, one-piece and formed in a single operation.

4. The switch of claim 1 wherein said non-conductive member is plastic.

5. An interactive book assembly comprising:
(A) a book having a plurality of semirigid pages, each of said pages having an exposed edge thereof with a respective uniquely positioned means for moving or permitting movement of a switch; and
(B) a housing disposed adjacent said exposed page edges and containing a plurality of the roller contact switches of claim 1 for sensing the presence of said switch-moving means on the page to which the book is open, and means for responding to a user-initiated action with a response appropriate for the page to which said book is open, said rigid portions of said switches being slidingly axially movable relative to said housing by said switch-moving means.

6. A roller contact switch for use in a housing having opposed ends of an interrupted electrical circuit, said switch comprising:
(A) an axially extending, electrically non-conductive member having a distal end adapted to be at least partially disposed within a housing for sliding axial movement relative thereto between an on position and an off position, said non-conductive member including:
  (i) an axially extending portion which is substantially rigid against any transverse movement and configured and dimensioned to be partially received in the housing for sliding axial movement relative thereto; and
  (ii) an axially extending portion which is substantially resilient for a transverse movement of said resilient portion relative to said rigid portion and has a transversely biased free end defining a roller seat;
(B) means biasing said non-conductive member for sliding axial movement towards one position of said on and off positions; and
(C) an electrically conductive, rigid roller having a transversely extending cylindrical body, said roller body being configured and dimensioned to be supported by said roller seat of said resilient portion free end for rotation within the housing relative thereto and for movement with said member distal end between a first position of said on and off positions, wherein said roller operatively connects opposed ends of an interrupted electrical circuit in the housing, and a second position of said on and off positions, wherein said roller is offset therefrom, said roller being biased by said roller seats in a transverse direction towards the opposed ends of the interrupted electrical circuit in the housing,
said rigid portion having a distal end including a pair of parallel legs partially defining a U-shaped slot, and, relative to a plane containing said legs, said resilient portion is at least partially disposed intermediate said parallel legs and has a free end transversely biased to the plane of said legs and extending distally beyond said legs to define said roller seat.

7. A roller contact switch for use in a housing having opposed ends of an interrupted electrical circuit, said switch comprising:
(A) an axially extending, electrically non-conductive member having a distal end adapted to be at least partially disposed within a housing for sliding axial movement relative thereto between an on position and an off position, said non-conductive member including:
  (i) an axially extending portion which is substantially rigid against any transverse movement and configured and dimensioned to be partially received in the housing for sliding axial movement relative thereto; and
  (ii) an axially extending portion which is substantially resilient for a transverse movement of said resilient portion relative to said rigid portion and has a transversely biased free end defining a roller seat;
(B) means biasing said non-conductive member for sliding axial movement toward one position of said on and off positions; and
(C) an electrically conductive, rigid roller having a transversely extending cylindrical body, said roller body being configured and dimensioned to be supported by said roller seat of said resilient portion free end for rotation within the housing relative thereto and for movement with said member distal end between a first position of said on and off positions, wherein said roller operatively connects opposed ends of an interrupted electrical circuit in the housing, and a second position of said on and off positions, wherein said roller is offset therefrom, said roller being biased by said roller seats in a transverse direction towards the opposed ends of the interrupted electrical circuit in the housing,
said roller having an enlarged head at each end of said body, said enlarged heads being disposed on opposite sides of said roller seat.

8. The switch of claim 7 wherein in said first position said enlarged heads are transversely aligned with the opposed ends of the interrupted electrical circuit and in said second position said enlarged heads are longitudinally offset from the opposed ends of the interrupted electrical circuit.

9. A roller contact switch for use in a housing having opposed ends of an interrupted electrical circuit, said switch comprising:
(A) a unitary, integral, one-piece axially extending, electrically non-conductive member formed of electrically non-conductive material in a single operation and having a distal end adapted to be at least partially disposed within a housing for sliding axial movement relative thereto between an on position and an off position, said non-conductive member including:
  (i) an axially extending portion which is substantially rigid against any transverse movement and configured and dimensioned to be partially received in the housing for sliding axial movement relative thereto, said rigid portion having a distal end including a pair of parallel legs partially defining a U-shaped slot; and
  (ii) an axially extending portion which is substantially resilient for a transverse movement of said resilient portion relative to a plane containing said legs, said resilient portion being at least partially disposed intermediate said parallel legs and having a free end transversely biased to the plane of said legs and extending distally beyond said legs to define a roller seat;
(B) means biasing said non-conductive member for sliding axial movement towards one position of said on and off positions; and (C) an electrically conductive, rigid roller having a transversely extending cylindrical body and an enlarged head at each end of said body, said roller body being configured and dimensioned to be supported by said roller seat of said resilient portion free end for rotation within the housing relative thereto and for movement with said member distal end between a first position of said on and off positions wherein said enlarged heads are transversely aligned with the opposed ends of the interrupted circuit and a second position of said on and off positions wherein said enlarged heads are longitudinally offset from the opposed ends of the interrupted circuit, said enlarged heads being disposed on opposite sides of said roller seat in a transverse direction towards the opposed ends of the interrupted electrical circuit in the housing.

10. The switch of claim 9 wherein said one position is said off position.

11. An interactive book assembly comprising:

(A) a book having a plurality of semirigid pages, each of said pages have an exposed edge thereof with a respective uniquely positioned switch-moving means for moving or permitting movement of a switch; and (B) a housing disposed adjacent said exposed page edges and containing a like plurality of roller contact switches, said housing having a like plurality of pairs of opposed ends of interrupted electrical circuits, each said switch comprising:

(i) a unitary, integral, one-piece axially extending, electrically non-conductive member formed of plastic in a single operation and having a distal end at least partially disposed within said housing for sliding axial movement relative thereto between an on position and an off position, said plastic member including:

(a) an axially extending portion which is substantially rigid against any transverse movement and configured and dimensioned to be partially receive in said housing for sliding axial movement relative thereto; and (b) an axially extending portion which is substantially resilient for a transverse movement of said resilient portion relative to said rigid portion and has a transversely biased free end defining a roller seat;

(ii) means biasing said plastic member for sliding axial movement towards one of said off and on positions; and (iii) an electrically conductive, rigid roller having a transversely extending cylindrical body, said roller body being configured and dimensioned to be supported by said roller seat of said resilient portion free end for rotation within said housing relative thereto and for movement with said member distal end between said on position, wherein said roller operatively connects one pair of opposed ends of the interrupted electrical circuit in said housing, and said off position, wherein said roller is offset therefrom, said roller being biased by said roller seat in a transverse direction towards said one pair of opposed ends of an interrupted electrical circuit in said housing;

said roller contact switches sensing the presence or absence of said switch-moving means on the page to which the book is open; and said housing including means for responding to a user-initiated action with a response appropriate for the page to which said book is open, said rigid portions of said switches being slidingly axially movable relative to said housing by said switch-moving means.

* * * * *